United States Patent
Yamazaki

Patent Number: 5,728,191
Date of Patent: Mar. 17, 1998

[54] PLUNGER FOR GOB FEEDER

[75] Inventor: Hiroki Yamazaki, Funabashi, Japan

[73] Assignee: Asahi Glass Company Ltd., Tokyo, Japan

[21] Appl. No.: 785,278

[22] Filed: Jan. 21, 1997

[30] Foreign Application Priority Data

Jan. 26, 1996 [JP] Japan ................ 8-011800

[51] Int. Cl.$^6$ .................................... C03B 7/086
[52] U.S. Cl. .............. 65/330; 65/362; 65/374.12
[58] Field of Search .............. 65/330, 331, 362, 65/325, 374.12, 828, 126, 129

[56] References Cited

U.S. PATENT DOCUMENTS

| | | | |
|---|---|---|---|
| 1,678,247 | 7/1928 | Ferngren | 65/330 |
| 1,843,175 | 2/1932 | Sears | 65/362 |
| 2,570,078 | 10/1951 | Spremulli | 65/330 |
| 2,570,079 | 10/1951 | Spremulli | 65/331 |
| 2,803,925 | 8/1957 | Klausmann | 65/330 |
| 3,157,482 | 11/1964 | Nero et al. | 65/362 |
| 3,230,060 | 1/1966 | Lippmann | 65/374.12 |
| 3,332,766 | 7/1967 | Ambrogi | 65/330 |

FOREIGN PATENT DOCUMENTS

| | | | |
|---|---|---|---|
| 157473 | 2/1954 | Australia | 65/330 |
| 4202278 | 7/1993 | Germany | |
| 4326143 | 12/1993 | Germany | |
| 2-153827 | 6/1990 | Japan | |

*Primary Examiner*—Steven P. Griffin
*Attorney, Agent, or Firm*—Oblon, Spivak, McClelland, Maier & Neustadt, P.C.

[57] ABSTRACT

A plunger for a gob feeder arranged at a forehearth of a glass melting tank furnace which includes a plunger head arranged above an opening of the forehearth, having a hollow space formed therein and, a raising and lowering unit for raising and lowering the plunger head so as to extrude molten glass in the forehearth from the opening when the plunger head is lowered.

5 Claims, 4 Drawing Sheets

PLUNGER FOR GOB FEEDER

BACKGROUND OF THE INVENTION

1. Field of the Invention

The present invention relates to a plunger for a gob feeder which supplies molten glass to a press machine by extruding, from an opening of a forehearth of a glass melting tank furnace, molten glass supplied to the forehearth.

2. Discussion of Background

A gob feeder for a glass melting tank furnace supplies molten glass to a press machine by extruding from an opening of a forehearth molten glass thermally controlled by the forehearth.

The gob feeder includes a plunger and a shear machine. The plunger is arranged above the opening of the forehearth so as to be raised and lowered, and the shear machines are arranged below the opening. When the plunger is lowered, the molten glass in the forehearth is extruded from the opening of the forehearth at a predetermined amount by a plunger head. The molten glass thus extruded is cut in a predetermined weight of molten glass gob (hereinbelow, referred to as "gob") by the shear machines, and is dropped into a mold of the press machine.

However, the conventional plunger head is so heavy that it creates disadvantages in that when a strong pressure is applied to in particular the plunger head, a shaft for raising and lowering the plunger is broken, or a platinum protective coating on the head is damaged due to expansion and contraction of the shaft.

SUMMARY OF THE INVENTION

The present invention has been devised, considering such circumstances. It is an object of the present invention to provide a plunger head for a gob feeder capable of preventing a plunger raising and lowering shaft and the plunger head from being damaged.

In order to attain the object, the present invention is characterized in that in a plunger head for a gob feeder arranged at a forehearth of a glass melting tank furnace so as to be raised and lowered, and extruding molten glass in the forehearth from an opening of the forehearth when the plunger head is lowered, the plunger head has a hollow space formed therein.

According to the present invention, the provision of the hollow space in the plunger head can make the weight of the plunger head lighter to reduce a load of the plunger head applied to the plunger raising and lowering shaft, thereby preventing the plunger raising and lowering shaft and the plunger head from being damaged.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, a preferable embodiment of a plunger head for a gob feeder according to the present invention will be described in detail with reference to the accompanying drawings.

Figure 1:
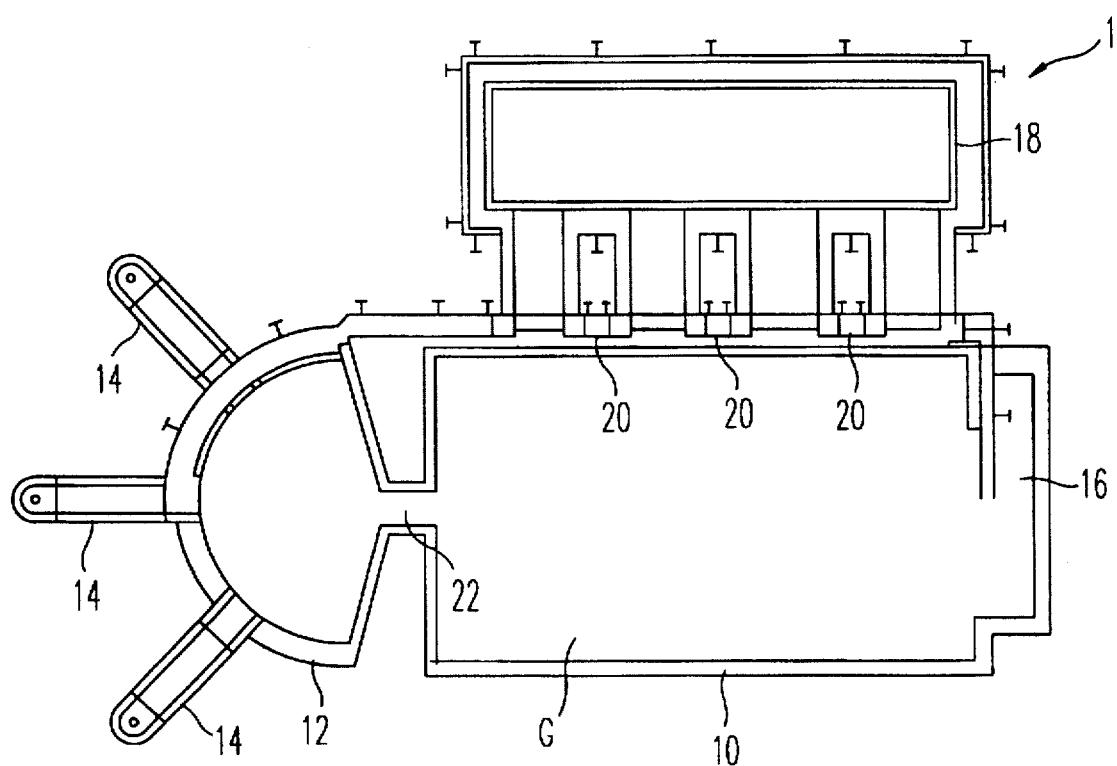
FIG. 1 is a plan view of a glass melting tank furnace.

In FIG. 1, there is shown a plan view of a side port type glass melting tank furnace to which a plunger head structure for a gob feeder according to the present invention is applied. The glass melting tank furnace 1 shown in FIG. 1 is constituted by a melting vessel 10, a cooling vessel 12, forehearths 14, 14, 14 and so on. In the embodiment shown, a dog-house 16 is provided on the right side of the melting vessel 10, and glass materials are supplied to the melting vessel 10 from the dog-house 16. The glass material supplied to the melting vessel 10 are molten by burners' frame to become molten glass G having a high temperature. The burners' flame is constituted by hot air from a regenerator 18 and oil sprayed from ports 20, 20, 20. The molten glass G is supplied from the melting vessel 10 to the cooling vessel 12 through a throat 22. After the molten glass is cooled to a predetermined temperature in the cooling vessel 12, the molten glass G is supplied to the forehearths 14, 14, 14.

Figure 2:
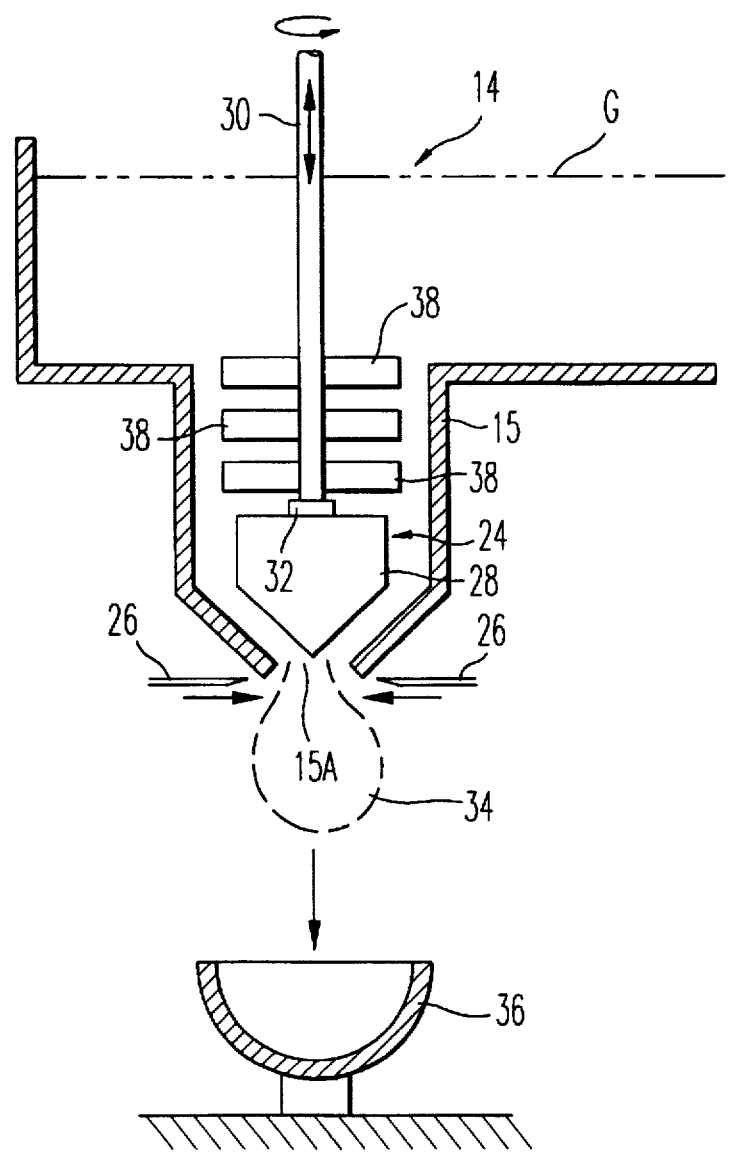
FIG. 2 is a cross-sectional view of a forehearth of the glass melting tank furnace shown in FIG. 1.

Each forehearth 14 is provided with a gob feeder shown in FIG. 2. The gob feeder is constituted by a plunger 24 and shear machines 26, 26, the plunger 24 is arranged so as to be raised and lowered in a recessed portion 15 formed at the forehearth 14, and the shear machines 26, 26 are arranged below an opening 15A formed at a lower end of the recessed portion 15.

The plunger 24 has a head 28 which has a lower portion formed in a conical shape, and which is fixed on a plunger raising and lowering shaft 30 with a threaded portion 32 thereof so as to be suspended therefrom. The plunger raising and lowering shaft 30 has an upper portion connected to a vertical drive unit and a rotational drive unit not shown. When the head 28 is lowered by operating the vertical drive unit, the molten glass G in the forehearth 14 is extruded from the opening 15A of the forehearth 14 at a predetermined amount by the head 28 of the plunger 24 as shown by a two-dot chain line in FIG. 2. The molten glass G thus extruded is cut into a gob 34 having a predetermined weight by cutting action of the shear machines 26, 26, and is dropped into a mold 36 of a press machine. When the shaft 30 is rotated by operating the rotational drive unit, stirring blades 38, 38, 38 fixed on the shaft 30 is rotated to stir the molten glass G in the forehearth 14.

Figure 3:
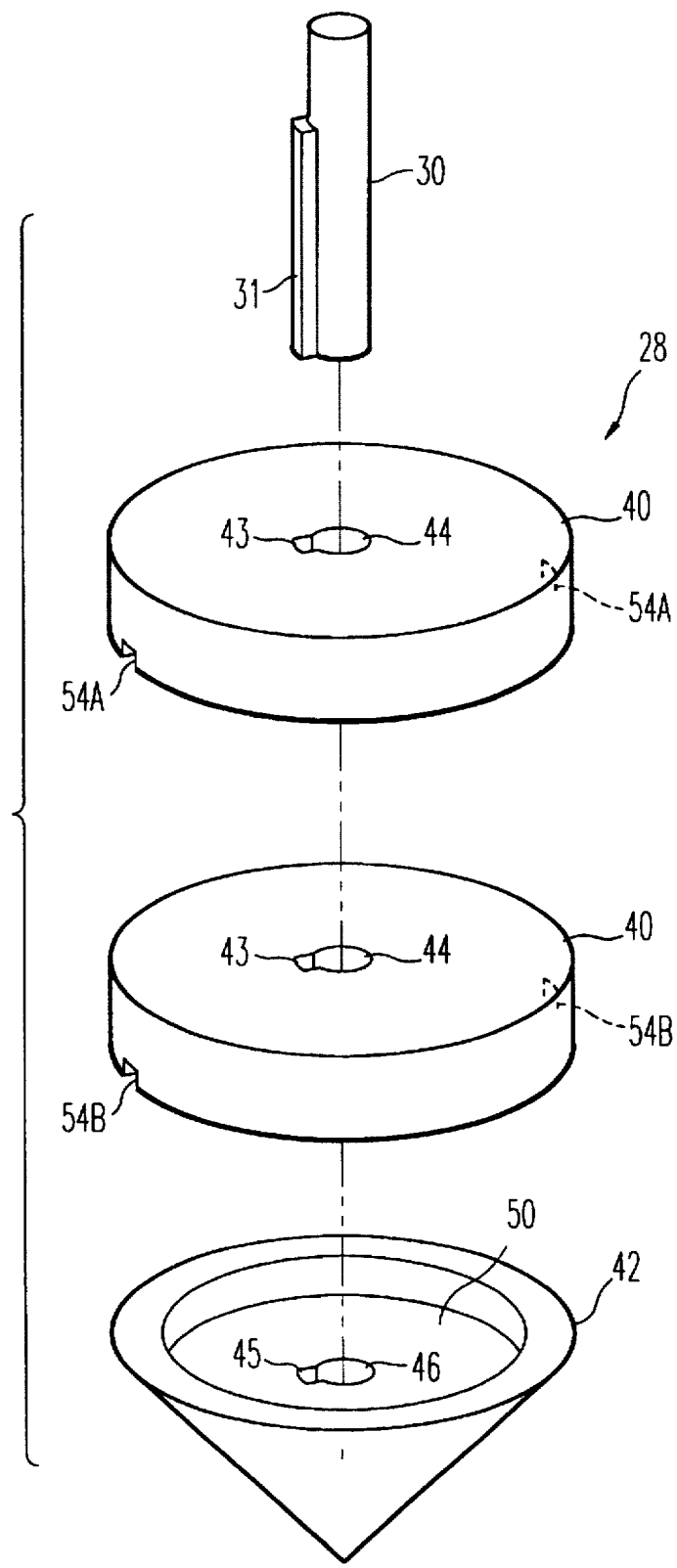
FIG. 3 is a perspective view of a plunger head for a gob feeder according to an embodiment of the present invention, showing how to assemble the plunger head.
Figure 4:
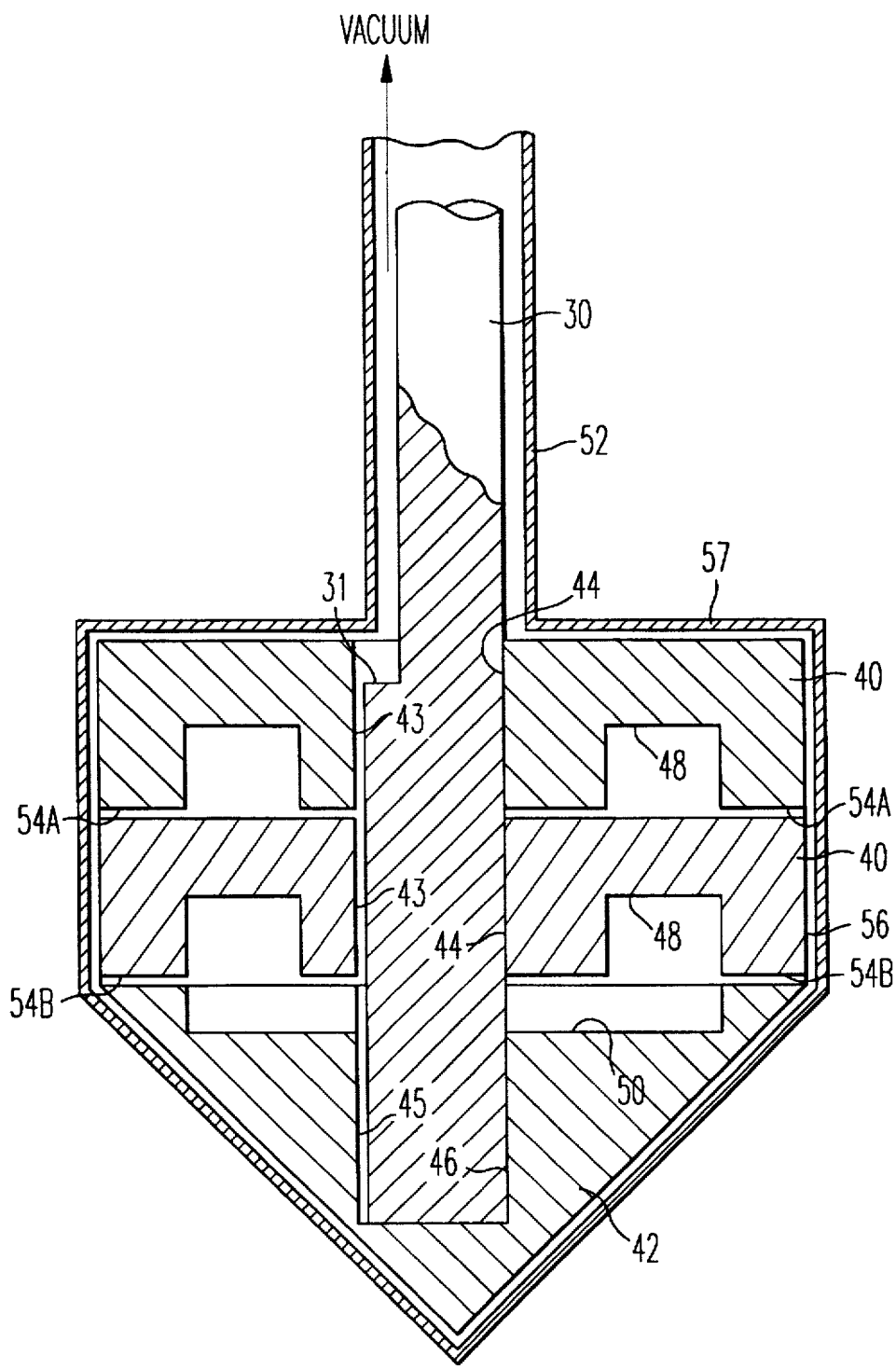
FIG. 4 is a vertical sectional view of the plunger head shown in FIG. 3.

Now, the structure of the head 28 of the plunger 24 will be explained. In FIG. 3, there is shown a perspective view of the head 28 to show how to assemble the head. In FIG. 4, there is shown a vertical sectional view of the head 28.

In FIG. 3, the head 28 is constituted by two disk-shaped blocks 40, 40 having a predetermined thickness, and a conical block 42. The respective disk-shaped blocks 40, 40 have central portions formed with through holes 44 with a keyway 43. The conical block 42 has a central portion formed with a hole 46 with a keyway 45. The blocks 40, 40, 42 are put one over the other so as to align the keyways 43, 43, 45, and then the shaft 30 has a key 31 engaged into the keyways 43, 43, 45 to fix the blocks on the shaft 30 at the right position.

As shown in FIG. 4, the respective disk-shaped blocks 40, 40 have the lower surfaces thereof formed with annular recessed portions 48, 48. The conical block 42 has an upper surface formed with a circular recessed portion 50 as shown in FIGS. 3 and 4. Those recessed portions constitute hollow spaces in the head 28, making the head lighter than a solid head by about 20%. It is preferable that the volume occupied by the hollow spaces is 5–50% of, in particular 10–40% of the volume of the head including the hollow spaces from the viewpoint that lightening and required stiffness are balanced. It is preferable that the hollow spaces are substantially symmetrically formed with respect to the axis of the plunger in order to stabilize the plunger.

The respective blocks 40, 40, 42 and the shaft 30 are made of molybdenum alloy having superior heat resistance. The respective blocks 40, 40, 42 and shaft 30 are coated with a noble metal film (a platinum alloy film 52), to prevent the molybdenum alloy from oxidized by the molten glass G. In addition, the respective blocks 40, 40 have the lower surfaces thereof formed with grooves 54A, 54B. In the embodiment shown, the groove 54A which is formed in the upper block 40 connects between the through holes 44 and the recessed portion 48 and also connects between the recessed portion 48 and a gap 56 between a peripheral portion of the block 40 and the platinum alloy film 52. The groove 54B which is formed in the lower block 40 connects among the through hole 44, the recessed portions 48, 50 and the hole 46, and also connects between the recessed portions 48, 50 and a gap 56 between a peripheral portion of the lower block 40 and the platinum alloy film 52.

When a vacuum device, which is connected to a gap between the shaft 30 and the platinum alloy film 52, is operated, the air in the recessed portions 48, 48, 50, the through holes 44, 44 and the holes 46 is sucked out through the grooves 54A, 54B to evacuate the hollow spaces in the head 28. This arrangement can prevent the molybdenum alloy from being oxidizing by the air in the hollow spaces.

In the plunger 24 constructed in accordance with the embodiment as stated earlier, the provision of the hollow spaces in the head 28 of the plunger 24 makes the head lighter than a solid head. As a result, a load of the head 28 which is applied to the plunger raising and lowering shaft 30 can be reduced to prevent the shaft 30 from damaged. In addition, the platinum alloy protective film 57 on the head can be prevented from being damaged due to expansion and contraction (thermal expansion) of the shaft to extend the life of the plunger 24.

As explained, in accordance with the plunger head of the present invention, the provision of a hollow space in the head can reduce a load of the head which is applied to the plunger raising and lowering shaft. As a result, the plunger raising and lowering shaft and the head can be prevented from being damaged.

Obviously, numerous modifications and variations of the present invention are possible in light of the above teachings. It is therefore to be understood that within the scope of the appended claims, the invention may be practiced otherwise than as specifically described herein.

What is claimed is:

1. A plunger for a gob feeder arranged at a forehearth of a glass melting tank furnace which comprises:

a plunger head arranged above an opening of the forehearth having a hollow space formed therein and;

a raising and lowering unit, said unit raising and lowering the plunger head so as to extrude molten glass in the forehearth from the opening when the plunger head is lowered;

wherein the plunger head comprises at least one metallic block coated with a noble metal and the hollow space is formed in said at least one metallic block;

wherein a gap is formed between said at least one metallic block and the noble metal coating and wherein the hollow space communicates with said gap; and wherein the gap is kept under a vacuum and wherein the hollow space has a volume occupying 5–50% of volume of the plunger head including the hollow space.

2. A plunger according to claim 1, wherein the hollow space is substantially symmetrically formed with respect to an axis of the plunger head.

3. A plunger according to claim 1, wherein the noble metal comprises platinum alloy.

4. A plunger according to claim 1, wherein the at least one metallic block is made of molybdenum alloy.

5. A plunger as claimed in claim 1, wherein said at least one block comprises a plurality of blocks and wherein at least one recessed portion is formed between adjacent blocks of said plurality of blocks.

* * * * *